United States Patent [19]

Aberson, Jr. et al.

[11] Patent Number: 4,749,248

[45] Date of Patent: Jun. 7, 1988

[54] DEVICE FOR TAPPING RADIATION FROM, OR INJECTING RADIATION INTO, SINGLE MADE OPTICAL FIBER, AND COMMUNICATION SYSTEM COMPRISING SAME

[75] Inventors: James A. Aberson, Jr., Atlanta; Ian A. White, Roswell, both of Ga.

[73] Assignee: American Telephone and Telegraph Company AT&T Bell Laboratories, Murray Hill, N.J.

[21] Appl. No.: 795,482

[22] Filed: Nov. 6, 1985

[51] Int. Cl.$^4$ .............................................. G02B 6/34
[52] U.S. Cl. .............................. 350/96.19; 350/96.15; 350/96.16
[58] Field of Search ................ 350/96.15, 96.16, 96.19

[56] References Cited

U.S. PATENT DOCUMENTS

| | | | |
|---|---|---|---|
| 3,883,221 | 5/1975 | Rigrod | 350/96.19 |
| 3,931,518 | 1/1976 | Miller | 250/227 |
| 4,135,780 | 1/1979 | Dyott | 350/96.15 |
| 4,253,727 | 3/1981 | Jeunhomme et al. | 350/96.15 |

OTHER PUBLICATIONS

*Theory of Dielectric Optical Waveguides*, Academic Press, 1974, by D. Marcuse, pp. 95–157.
*Digest of Technical Papers of the Conference on Optical Fiber Communication*, New Orleans, La., Jan. 1984, by N. Lagakos, pp. 56–58.
*First International Conference on Optical Fibre Sensors*, London, Apr. 1983, pp. 117–121.
*Appl. Phys. Lett.* 41(2), 15 Jul. 1982, "Microbend Optical Fiber Tapped Delay Line for Gigahertz Signal Processing", by K. P. Jackson et al., pp. 139–141.
*Applied Optics*, vol. 10, No. 10, Oct. 1971, "Weakly Guiding Fibers", by D. Gloge, pp. 2252–2258.
*Optical Engineering*, vol. 17(5), pp. 470–479 (1978), by A. M. Glass, "The Photorefractive Effect".

*Primary Examiner*—Eugene R. LaRoche
*Assistant Examiner*—James C. Lee
*Attorney, Agent, or Firm*—Eugen E. Pacher

[57] ABSTRACT

Optical radiation can be efficiently removed from, or injected into, single mode optical fiber at an intermediate point along the fiber, by causing quasi-resonant coupling of the guided mode $LP_{01}$ to an appropriate tunneling leaky (TL) mode, e.g., $LP_{11}$. Such coupling is caused by means of a "grating" in the fiber, with the grating being formed by impressing a periodic (or pseudo-periodic) modulation on the fiber, or by causing a periodic (or pseudo-periodic) variation of the refractive index of the fiber by means of the photoelastic or the photorefractive effect. The nominal grating spacing $\Lambda(z)$ is chosen such that $\Omega_o = (2\pi/\overline{\Lambda}) > \beta_{01} - 2\pi n_{cl}/\lambda_o$, where $\overline{\Lambda}$ is the average grating spacing, $\beta_{01}$ is the propagation constant of the $LP_{01}$ mode, $n_{cl}$ is the refractive index of the fiber cladding, and $\lambda_o$ is the wavelength of the radiation to be coupled from or into the fiber. Furthermore, $\Lambda(z)$ is to be chosen such that $\Omega_o \sim \beta_{01} - \beta_{rs}$, where $\beta_{rs}$ is the propagation constant of the selected TL mode. In order for the coupling to be quasi-resonant, it is necessary that $\alpha_{rs}$, the attenuation constant of the selected TL mode, be relatively small, typically <1 dB/cm. By appropriately choosing $\Lambda(z)$ and/or the amplitude function of the grating, it is possible to increase the coupling efficiency above what is possible with a constant spacing, constant amplitude grating. Devices according to the invention can be advantageously used not only as radiation couplers but also as filters and, if they are of the photorefractive type, as amplitude modulators.

17 Claims, 4 Drawing Sheets

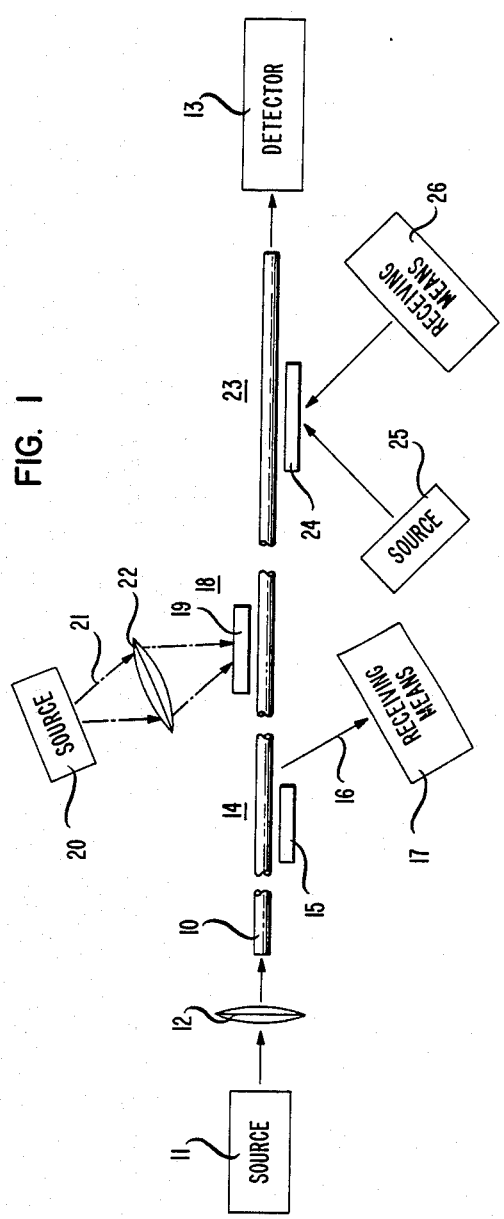
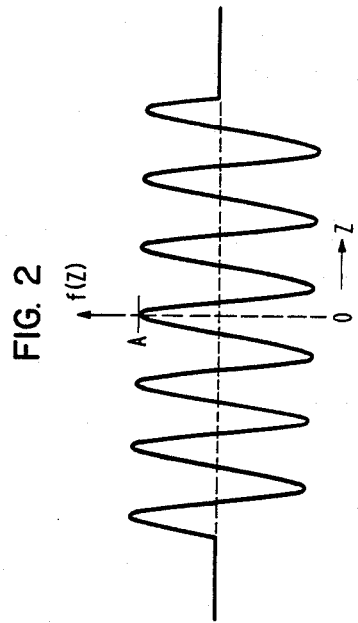
FIG. 1
FIG. 2

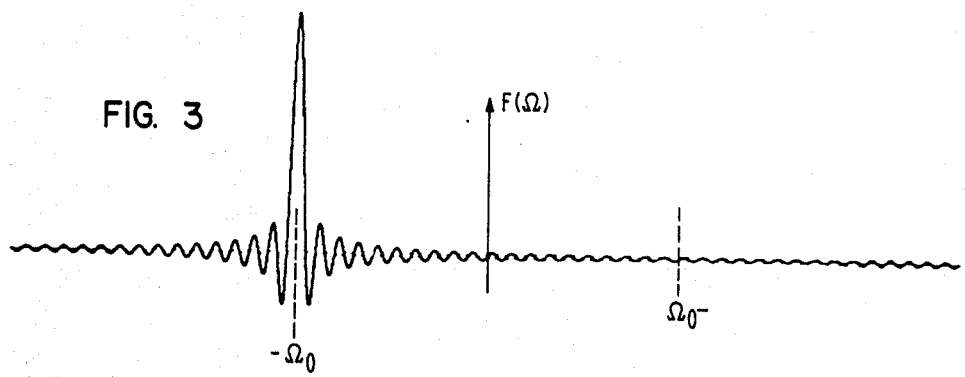
FIG. 3
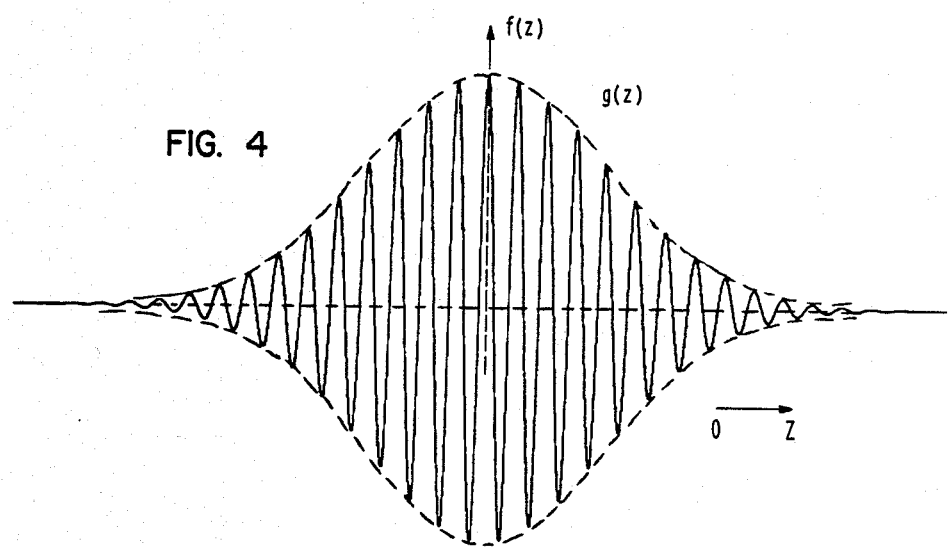
FIG. 4
FIG. 5
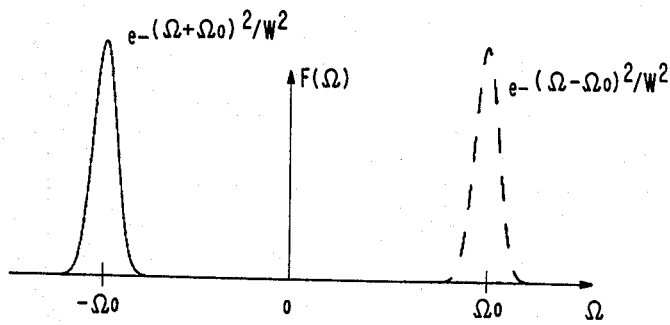

DEVICE FOR TAPPING RADIATION FROM, OR INJECTING RADIATION INTO, SINGLE MADE OPTICAL FIBER, AND COMMUNICATION SYSTEM COMPRISING SAME

FIELD OF THE INVENTION

This invention pertains to devices for coupling optical power from and/or into optical fiber, and to optical fiber communication systems comprising such devices.

BACKGROUND OF THE INVENTION

Optical communications has undergone very rapid development, to the point where optical fiber transmission systems are becoming almost commonplace. Optical fiber is not only used for trunk (i.e., long-haul) applications, but also to transfer information over short distances, e.g., in local area networks, and potentially, in the subscriber loop.

In many applications it is necessary, or at least desirable, to inject optical power into a fiberguide at intermediate locations, and/or to extract optical power from the fiberguide at such locations, without the need for breaking or terminating the fiberguide, and without requiring special preparation of the coupling point in the fiberguide. Such couplers have been known in the art for some time. See, for instance, co-assigned U.S. Pat. No. 3,931,518, ('518), issued Jan. 6, 1976, to S. E. Miller, which teaches a particular embodiment of a coupler type which will herein be referred to as a "grating" coupler.

The '518 patent teaches that optical power can be coupled from an optical fiber by impressing a periodic deformation onto the fiber, with the periodicity of the deformation chosen such as to induce coupling between appropriate modes of radiation. In this fashion power can be transferred resonantly from lower to higher order guided or bound modes, and nonresonantly from the higher bound modes to the so-called tunneling leaky (TL) modes, which are then removed from the cladding of the fiberguide with the aid of a dielectric body that is in contact with the fiberguide at a point downstream from the periodic deformation region and which has a refractive index which is approximately equal to or greater than the index of refraction of the cladding.

For an exposition of the relevant theory, see, for instance, D. Marcuse, *Theory of Dielectric Optical Waveguides*, Academic Press, 1974, especially pages 95-157. Briefly, it can be shown that it is possible to provide a coupling mechanism in multimode fiber such that the (i, j)'th and (p, q)'th bound modes are coupled to produce complete energy exchange over a coupling length $L_c = \pi / R_{ij,pq}$, where the coupling constant $R_{ij,pq}$ depends upon fiber parameters such as the core radius, the refractive index difference between core and cladding, the operating wavelength, the fiber profile shape, and, in a coupler as disclosed in '518, on the amplitude of the distortion of the fiber. As the distortion amplitude increases, the coupling length $L_c$ decreases. Thus, a prior art coupler as disclosed in '518 can be tuned for maximum efficiency by adjusting the amplitude of the distortions of the multimode fiber, to result in resonant energy transfer from low to higher order bound modes.

Although '518 teaches that optical power can be coupled from the single guided mode (usually referred to as the $LP_{01}$ mode) of single mode fiber to one or more of the TL modes of such fiber, and that, therefore, couplers of the type disclosed in '518 could be used not only with multimode fiber but also with single mode fiber, this type of coupler has in fact only been used in conjunction with multimode fibers. The reason for this is as follows. It is generally understood in the art that the coupling process between bound modes in multimode fiber is a resonance process, and that consequently the coupling parameters can be adjusted to result in efficient resonant power transfer into high order bound modes, and from there nonresonantly into TL modes. On the other hand, the theory teaches that, in single mode fiber, the coupling between $LP_{01}$, the bound mode, and a TL mode, e.g., $LP_{11}$, is nonresonant, such that the radiation amplitude in $LP_{01}$ decreases exponentially with distance along the propagation direction, due to the continuous transfer to the TL mode of a constant fraction of the power in $LP_{01}$. See, for instance, page 112 of the above cited book by Marcuse, where it is stated that, for the case of a single-mode guide, the power coupled into TL (radiation) modes is radiated from the guide and does not interact with the guided mode. Since such nonresonant coupling cannot be tuned to result in efficient power transfer between $LP_{01}$ and TL modes, it is generally accepted in the art that fiber taps of the "grating" type cannot be made to function efficiently in single mode fiber.

The fact that microbending-induced mode coupling in multimode fibers can involve a resonance mechanism has also been used to construct highly sensitive fiber optic displacement sensors. See, for instance, N. Lagakos, *Digest of Technical Papers of the Conference on Optical Fiber Communication*, New Orleans, La., January 1984, pp. 56-58.

G. F. Lipscomb et al, *First International Conference on Optical Fiber Sensors*, London, April 1983, pp. 117-121, report on the result of experiments with single mode and multimode optical fiber, in which a single bend was induced in the fiber by bending the latter around a cylindrical mandrel. Interference effects between bound modes and TL modes were observed in both types of fiber. In particular, it was observed that the bending causes some of the core-mode power to convert into the cladding-mode power and, at specific angles, some of the cladding-mode power to convert back into core-mode power. It will be noted that the interference effects in the single-bend configuration of Lipscomb et al are not the desired resonance coupling effects that are of concern in this application. In this respect, see also pages 156-157 of the above cited book by Marcuse.

K. P. Jackson et al *Applied Physics Letters*, Vol. 41(2), pp. 139-141 (1982) report on a tapped single mode optical fiber delay line. The taps were formed by urging a tapping pin against the fiber, thereby inducing a 1.5 mm bend radius in the fiber. No resonant coupling is involved in this technique.

Since single mode optical fiber is rapidly becoming the fiber type of choice for long distance transmission, and is considered to be a promising medium even for short-haul applications in which a multiplicity of sending and/or receiving stations are connected by a single or dual fiber transmission path, it is clear that it would be very desirable to have available efficient means for coupling optical power into, and/or out of, single mode optical fiber without breaking the fiber and without permanently changing the characteristics of the fiber in the coupling region. This application discloses such coupling means.

GLOSSARY OF TERMS

An "optical fiber" (or fiberguide, or other equivalent term) is an elongated body comprising an interior region (the core) having a higher refractive index (at the signal wavelength $\lambda_o$) than the region surrounding the core, the cladding. Optical fiber can comprise cladding having a multiplicity of regions differing from each other with respect to the refractive index, and typically is enveloped by a coating, or multiple coatings. The coating typically is a polymer and may be transparent (and in fiber used in practicing the invention typically is transparent) to the radiation coupled into or from the fiber.

In optical communications systems frequently two or more lengths of fiber are spliced or otherwise joined together to form a continuous optical transmission path from a first fiber end to a second fiber end. One end often can be considered to be the input end and the other the output end of the transmission path. However, it is possible to operate a system such that a given path carries signals in both directions, with sending and receiving means at each fiber end.

The radiation guided in an optical fiber, or radiated therefrom, can be described in terms of "modes" of radiation. Herein the nomenclature introduced by D. Gloge, *Applied Optics*, Vol. 10, pp. 2252–2258 (1971) is used to identify the modes. With each mode $LP_{ij}$ can be associated an attenuation constant $\alpha_{ij}$ and a propagation constant $\beta_{ij}$.

"Tunneling leaky"(TL) modes in single mode fiber are the low order radiating modes ($LP_{11}$, $LP_{12}$, $LP_{21}$, ...) that have relatively small attenuation constants.

"Coupler" herein refers both to means for extracting optical power from an optical fiber at an intermediate fiber location, and to means for injecting optical power into an optical fiber at an intermediate fiber location.

A "grating" herein is an intermediate fiber region in which the transmission characteristics of the fiber are varying in a periodic or pseudo-periodic fashion. A grating comprises N elements, with repeat length $\Lambda(z)$, where z is the longitudinal fiber coordinate. Associated with the grating is an "envelope amplitude" described by an "envelope" function g(z) that can be a constant or vary as a function of z. The fiber characteristics vary in a "periodic" manner if $\Lambda(z)$ is a constant, and they vary in a "pseudo-periodic" manner if $\Lambda(z)$ is a regular and predetermined function of z. The "amplitude" of an element of a grating is the maximum fiber axis displacement, or the maximum refractive index change, associated with the element.

SUMMARY OF THE INVENTION

The invention comprises means for efficiently coupling electromagnetic radiation of wavelength $\lambda_o$ into or from an intermediate part of a single mode optical fiber, i.e., without breaking or terminating the fiber, and typically without permanently modifying the transmission properties of the fiber, e.g., by removal of all or part of the cladding material at the coupling location. The coupling means comprises means for forming a grating, e.g., means for locally changing the optical characteristics of the fiber by impressing a multiplicity of regularly (periodically or pseudo-periodically) spaced deformations on the fiber, or by changing the refractive index of the fiber in a multiplicity of regularly spaced fiber regions. In a coupling device according to the invention the grating spacing $\bar{\Lambda}(z)$ is chosen such that $\Omega_o = (2\pi\bar{\Lambda}) > \beta_{01} - 2\pi n_{cl}/\lambda_o$, where $\bar{\Lambda}$ is the average repeat spacing, $\beta_{01}$ is the propagation constant of the $LP_{01}$ mode in the fiber, and $n_{cl}$ is the refractive index of the fiber cladding. Furthermore, in such a device according to the invention the grating spacing $\Lambda(z)$ is chosen such that $\Omega_o \sim \beta_{01} - \beta_{rs}$, where $\beta_{rs}$ is the propagation constant of a TL mode $LP_{rs}$ in the fiber. This choice of repeat distance can result in quasi-resonant energy transfer between $LP_{01}$ and $LP_{rs}$ (and adjacent modes), provided the power loss from $LP_{rs}$ is small over the distance $N\bar{\Lambda}$. A typical upper limit on the attenuation constant $\alpha_{rp}$ of the $LP_{rp}$ mode is about 1 dB/cm.

The grating can be produced by any appropriate means, including by urging one, or a pair of, suitably corrugated bodies against the fiber, thereby impressing deformations on the fiber, or by appropriately changing the refractive index of the fiber, for instance by means of the photorefractive or of the photoelastic effect.

The grating can have constant amplitude, or the amplitude can be a function of z. Furthermore, the grating can be periodic, i.e., with $\Lambda$ being constant, or it can be pseudo-periodic, with the repeat spacing being a function of z. Appropriately shaped nonconstant amplitude may result in improved coupling between the fiber and an external radiation detector or radiation source, as will be described in detail below. Use of pseudo-periodic gratings may, inter alia, result in a coupler having enhanced frequency dependence. Such a coupler may, inter alia, be useful as a notch filter. The "shaping" of the grating to thereby increase coupling efficiency, frequency response, or other device characteristic, is considered to be a significant aspect of the invention.

Due to the fact that devices according to the invention can be made to be highly wavelength selective, such devices are considered to be potentially of utility as wavelength-dependent couplers in wavelength division multiplexed systems, or in Raman amplified soliton systems. Devices according to the invention are also potentially useful as notch filters, as photorefractive modulators, or as variable attenuators. Attenuators according to the invention possess a highly advantageous feature not typically found in prior art attenuators, namely, they do not cause power to be reflected back to the radiation source. Such reflection may affect the emission characteristics of sensitive sources and thus is undesirable. Furthermore, gratings according to the invention can be used in temporary taps such as are frequently required for repair or reconfiguration purposes. In such cases, the grating can advantageously be incorporated into a clamp-on device. Such devices can be used with coated or buffered individual fiber as well as with laminated ribbon fibers.

Disclosed is also an optical fiber communications system comprising a source of radiation of wavelength $\lambda_o$, a single mode optical fiber, means for coupling the radiation into the fiber at a first fiber location, means for detecting the radiation, after its transmission through the fiber, at a second fiber location spaced apart from the first location, means for coupling radiation (of wavelength $\lambda_o$, or possibly of wavelength $\lambda \neq \lambda_o$) into and/or from the fiber at a third fiber location intermediate the first and second locations, with the coupling means being of the type described above. The system optionally may comprise couplers according to the invention used as attenuators, filters, or modulators.

BRIEF DESCRIPTION OF THE DRAWINGS

FIG. 1 schematically shows an exemplary fiberguide communications system comprising means for injection and extraction of optical power at intermediate fiber regions;

FIG. 2 depicts schematically the axis of an optical fiber with periodic distortions that form a "grating" constant amplitude;

FIG. 3 is a plot of the Fourier transform of the grating function $f(z) = A \cos\Omega_o z$, $(-\pi N/\Omega_o) < z < (\pi N/\Omega_o)$;

FIG. 4 is a plot of the grating function $f(z) = g(z) \cos\Omega_o z$, for the same range of z as in FIG. 3, where $g(z) = \exp(-z^2/a^2)$;

FIG. 5 depicts the Fourier transform of the function shown in FIG. 4;

DETAILED DESCRIPTION

Figure 6:
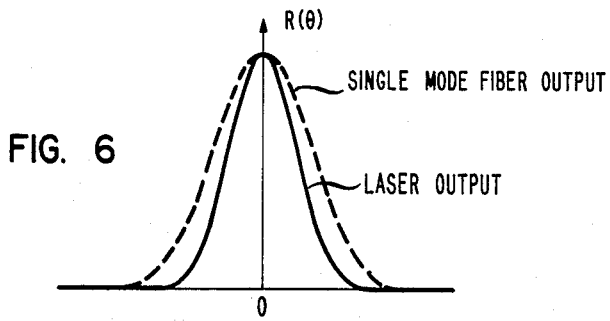
FIG. 6 shows the radiation pattern of an exemplary semiconductor laser and the acceptance function of an exemplary single mode fiber.

FIG. 1 schematically depicts an exemplary communications system according to the invention, in which 10 is a length of optical fiber, 11 a source of electromagnetic radiation, e.g., a laser emitting at 1.55 μm, 12 means for coupling the radiation into an end of the fiber, and 13 is a radiation detector. Intermediate locations 14, 18, and 23 are sites at which coupling means according to the invention are deployed, with 15 being means for tapping radiation 16 from the fiber, 19 being means for injecting radiation 21 into the fiber, and 24 being means for both tapping and injecting of radiation. Receiving means 17 and 26 can be any means for receiving the tapped radiation, e.g., a detector, or another fiber. Similarly, sources 20 and 25 can be any source of radiation to be injected, e.g., a laser, a LED, or another fiber. Although means 22 for changing the shape of the radiation pattern are shown at only one coupling site, it is clear that such means can, but need not be, used generally.

A central aspect of the instant invention is the discovery that it is possible to achieve essentially resonant coupling between the propagating mode $LP_{01}$ and TL modes, principally $LP_{11}$, in single mode optical fiber. This discovery, which is not predicted by currently accepted theory, makes possible the construction of very efficient means for coupling radiation from, and/or into, single mode optical fiber at intermediate points along the fiber, without having to break or terminate the fiber.

If the loss of optical power from a TL mode in a fiber length of the order of a centimeter is only a small fraction of the power in the mode, then the radiation mode acts locally essentially as if it were a bound mode. That is to say, if the quantity $N\bar{\Lambda}\alpha_{rs} << 1$ for the TL mode $LP_{rs}$ then the power transfer between $LP_{01}$ and $LP_{rs}$ can be essentially resonant. Under these circumstances, coupling conditions (e.g., grating spacing $\Lambda(z)$, number of elements N, and amplitude of the envelope function $g(z)$) can be found such that the radiation can be efficiently coupled into, or from, a single mode optical fiber. Although useful coupling may also be possible if the $LP_{rs}$ mode attenuation constant is greater than about 1 dB/cm, we currently consider 1 dB/cm to be a realistic upper limit of the permissible attenuation of the selected TL mode or modes.

Many currently used single mode fiber designs are such that, at the design wavelength $\lambda_o$ of the fiber, the lowest order TL mode ($LP_{11}$) has a relatively small attenuation constant $\alpha_{11}$, such that the above discussed limitation generally can be met at least for $LP_{11}$, and typically also for other TL modes.

As previously discussed, mode coupling is produced by means of a "grating" introduced into the fiber at or near the location where optical power is to be injected into, or removed from, the fiber core. The TL mode $LP_{rs}$ to which $LP_{01}$ couples most strongly is selected by appropriate choice of grating parameters, principally of the repeat distance $\Lambda(z)$ for a given wavelength. By choosing $\Lambda(z)$ such that $\Omega_o = (2\pi/\bar{\Lambda}) > \beta_{01} - (2\pi/\lambda_o)n_{cl}$ one insures that $LP_{01}$ couples to one (or more) TL modes. By furthermore choosing $\Lambda(z)$ such that $\Omega_o = \beta_{01} - \beta_{rs}$ the grating causes quasi-resonant coupling principally between $LP_{01}$ and $LP_{rs}$, if $N\bar{\Lambda}\alpha_{rs} << 1$. An exemplary value for $\bar{\Lambda}$ is of the order of 500 μm. Typically, the grating repeat distance in single mode fiber is less than about 1 mm, which is to be contrasted with the situation in multimode fiber, where the repeat distance typically is greater than 1 mm.

For realistic gratings in typical single mode fiber, the resonance is of finite width. By this is meant that, for $\Omega_o = \beta_{01} - \beta_{rs}$, coupling occurs not only between $LP_{01}$ and $LP_{rs}$, but also, albeit weaker, between the former and TL modes $LP_{ij}$ whose propagation constant is close to $\beta_{rs}$. In particular, for an N-element grating one can show that a measure of the resonant coupling width is $\Omega_o N^{-1}$, i.e., resonance coupling will occur to modes $LP_{ij}$ if $|\beta_{rs} - \beta_{ij}| < \Omega_o N^{-1}$.

The required repeat distance for a given fiber can either be determined by computing the propagation constants for the relevant modes by known methods, or it can be determined experimentally. Frequently, it will be found advantageous to use a combination of the two approaches. As is well known, the value of the propagation constant of a given mode depends not only on the wavelength of the radiation but also on fiber parameters, including effective refractive index and index profile shape.

In order to characterize a grating, it is not only necessary to specify the repeat distance but also further parameters, including the envelope function. For instance, for a grating formed by spatially periodic distortions of the fiber, the envelope function specifies the amplitudes of the distortions impressed on the fiber axis. For a grating formed by spatially periodic variations of the refractive index of the fiber, the envelope function typically specifies the maximum refractive index of the various grating elements.

In a simple exemplary case, the grating is sinusoidal, i.e., it can be described by a function $f(z) = A \cos\Omega_o z$, for $(-\pi N/\Omega_o) < z < (\pi N/\Omega_o)$, and zero otherwise. The coordinate origin has been selected such that the grating is symmetrical about the coordinate origin. This is done for the sake of convenience only, and has no fundamental significance.

This function is depicted in FIG. 2, with greatly exaggerated ordinate. In the above exemplary case the envelope function is a constant (A) independent of z. In general, however, the envelope function can be a function of z, and, as will be discussed next, gratings with nonconstant envelope can advantageously be used in devices according to the invention.

As is well known, the radiation pattern from a diffraction grating is described by the Fourier transform of the grating function. Similarly, the pattern of radiation emitted from a fiber that comprises a grating as discussed herein is proportional to the Fourier transform of the envelope function. Since reciprocity applies to the inventive devices, it can immediately be asserted that the Fourier transform of the envelope function also corresponds to the pattern of radiation that can be injected into the fiber by means of the grating. The Fourier transform $F(\xi)$ of a function $f(z)$ is defined as follows:

$$F(\Omega) = (1/\sqrt{2\pi}) \int_{-\infty}^{\infty} f(z)\exp(i\Omega z)dz.$$

By way of illustration, if a grating is described by $$f(z) = A\cos\Omega_o z,$$

for $(-\pi N/\Omega_o) < z < (\pi N/\Omega_o)$, then $$F(\Omega) = \frac{\sin[N(\Omega - \Omega_o)/\Omega_o]}{(\Omega - \Omega_o)} - \frac{\sin[N(\Omega + \Omega_o)/\Omega_o]}{(\Omega + \Omega_o)}.$$

A graph of the first term of this expression is shown in FIG. 3, and corresponds closely to $F(\Omega)$, since the second term does not produce a significant effect.

The Fourier transform of a grating function is related to the radiation pattern in the cladding of the fiber through the expression $$\theta_{ij} = \cos^{-1}(\lambda_o \beta_{ij}/2\pi n_{cl}), \quad (1)$$

with the relative radiation amplitude in the direction that makes an angle $\theta_{ij}$ with the undistorted fiber axis being proportional to the amplitude of the Fourier transform for $\Omega = \beta_{01} - \beta_{ij}$. The radiation pattern outside of the fiber can be derived from the pattern in the cladding by a simple application of Snell's law, as will be understood by those skilled in the art. It will also be understood that, in the case of a grating that has a symmetry plane that contains the axis of the fiber, the radiation pattern is symmetrical about the same symmetry plane.

Under appropriate circumstances the coupling efficiency to an external radiation source (e.g., a laser, a LED, or another optical fiber) or a radiation receiver (e.g., a photodetector diode, another fiber or other optical waveguide, including a planar optical waveguide) can be increased by choice of grating shape (e.g., amplitude $g(z)$). In particular, it is advantageous to form a grating such that the Fourier transform of the grating function $f(z)$ approximates the radiation pattern of the external source or the aperture function of the receiver. This is illustrated in FIGS. 4 and 5, which schematically show an exemplary grating with nonconstant (Gaussian, i.e., $g(z) \propto \exp(-z^2/a^2)$) amplitude and the Fourier transform of the grating function, respectively. The Fourier transform is to be compared with FIG. 6, in which curve 60 is the exemplary radiance distribution of a semiconductor laser, and curve 61 is the output pattern of an exemplary single mode fiber. The close match between the shape of a peak of the Fourier transform (FIG. 5) and the shape of the curves of FIG. 6 is apparent, indicating the close possible matching between these sources and a coupler of Gaussian amplitude.

The pseudo-periodic grating function $f(z) \propto [J_1(\Omega_B z)/z]\cos(\Omega_M z)$ has the Fourier transform $F(\Omega) = [1 - (\Omega - \Omega_M)^2/\Omega_B^2]^{\frac{1}{2}}$ for $-\Omega_B < (\Omega - \Omega_M) < \Omega_B$, and $F(\Omega) = 0$ for $\Omega - \Omega_M > \Omega_B$. In these expressions, $J_1(\Omega_B z)$ is the well known first order Bessel function, $\Omega_M = 2\pi/\Lambda_M$, where $\Lambda_M$ is the central grating spacing, and $\Omega_B$ is a constant that determines the width of the Fourier transform. A grating that is described by the above grating function is particularly advantageous as a notch filter, since it will pass unattenuated all wavelengths of radiation, except those in a narrow spectral range.

As expressed by the principle of reciprocity, couplers according to the invention have identical radiation pattern and aperture function. Thus the curve of FIG. 5 also represents the radiation pattern of the coupler used as a tap. Similarly, curve 61 of FIG. 6 corresponds also to the aperture function of a single mode fiber. Thus it is possible to closely match an inventive coupler to a single mode receiving fiber. Frequently it is advantageous to alter the beam width by means of a lens or lenses, for instance, when coupling into the end, or from the end, of a single mode optical fiber.

Figure 9:
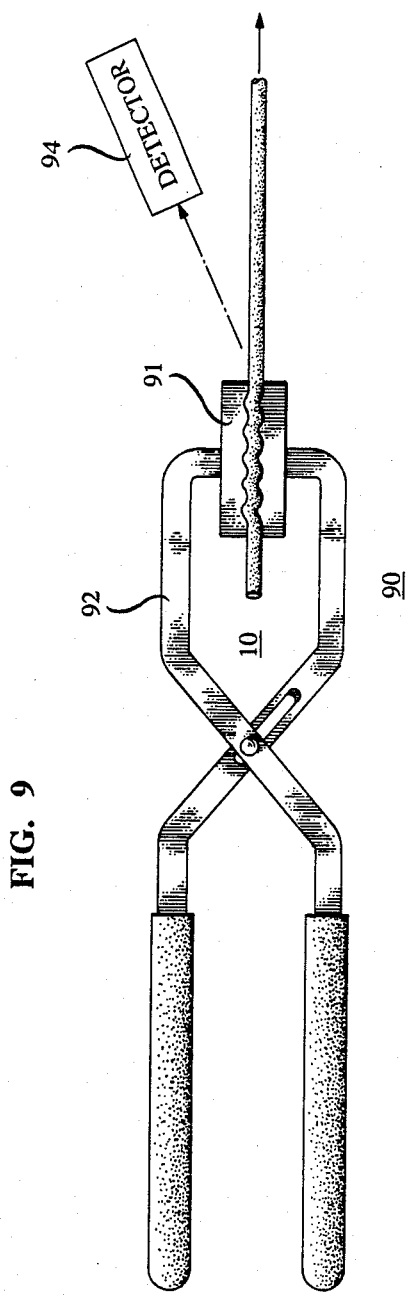

As mentioned above, a method for forming a grating in a fiber is to mechanically distort the fiber, such that the axis of the fiber assumes the appropriate shape, i.e., as described by the grating function. Means for achieving this are known. See, for instance, U.S. Pat. Nos. 3,931,518, 4,135,780, and 4,253,727. For instance, two corrugated metal, glass, ceramic, or plastic plates can be urged against the fiber, with the corrugations aligned to achieve a periodic fiber axis distortion. For instance, a grating can be introduced into an optical fiber by a clamp-on device, such as is schematically depicted in FIG. 9, which shows optical fiber 10, clamp-on device 90, and radiation detector 94. The clamp-on device comprises corrugated means 91, and means 92 for urging the corrugated means against the fiber. Also shown is detector 94 for detecting the radiation caused to be emitted from the fiber.

Another possible method for producing a grating in the fiber is the application of a spatially periodic stress to the fiber to induce a periodic variation in the refractive index via the photoelastic effect. Such a stress can be produced by means similar to those used for producing the axial distortion. In the case of grating-formation by axial distortion, it is typically not required to remove the fiber coating, whereas in the photoelastic case, at least with silica-based fiber, the necessary stresses are such that we currently consider it preferable to remove the fiber coating. However, the invention can be practiced with other than silica-based fibers, and other materials, e.g., plastics, can have a substantially larger photoelastic coefficient than $SiO_2$, and therefore require smaller stresses.

Another method for forming the grating uses the photorefractive effect. The presence of an appropriate dopant (e.g., Fe or Bi) in the fiber core can result in a change of refractive index upon exposure of the fiber to light of appropriate wavelength. For instance, exposing Bi-doped silica to radiation of wavelength of about 568 nm is expected to produce a change in the refractive index of the exposed region.

Figure 7:
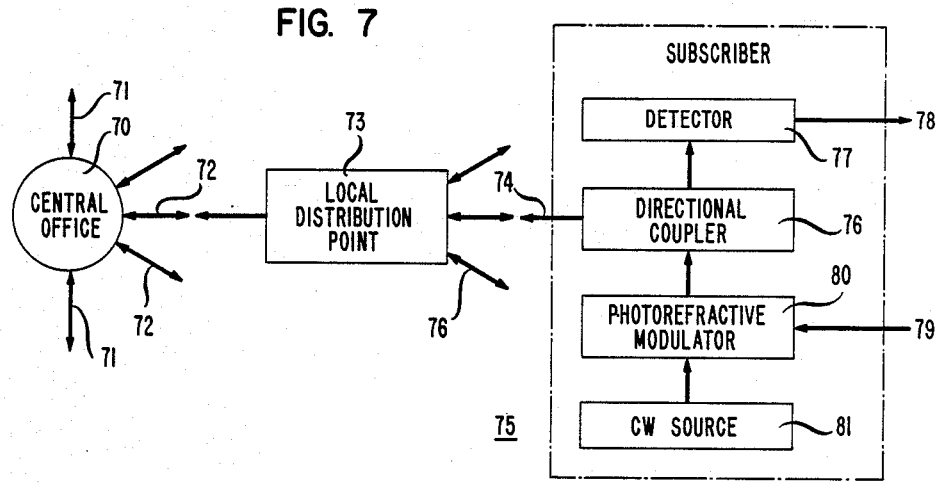
FIG. 7 schematically shows an exemplary communications system comprising a photorefractive modulator.

The photorefractive method avoids the possibility of mechanical damage to the fiber, and offers the potential for forming a grating with time-dependent parameters. Such a grating can be used to modulate the amplitude of radiation guided in the fiber, by time-dependent removal of radiation from the fiber. Such a device can be used, for instance, on customer premises, to provide economical means for modulating an inexpensive cw light source. A portion of an exemplary communications system incorporating such devices is schematically depicted in FIG. 7, wherein 70 corresponds to a telephone central office or other major switching center connected by trunk lines 71 to other similar centers. Multiplexed optical pulses are transmitted over optical fiber lines 72 from and to local distribution points 73, of which only one is shown. Signals arriving in 73 from 72 are demultiplexed and distributed to subscriber lines 74 and transmitted to subscriber stations 75 (only one is shown). The subscriber apparatus typically would comprise a directional coupler 76 if 74 is used as a two-way transmission path. However, no such coupler may be necessary if 74 is a duplex line. In either case, signals arriving in 75 are detected by detector 77, whose output 78 is available for processing by known means. The station apparatus also comprises a cw light source 81 (e.g., an LED, or a wide band source such as an incandescent source together with appropriate narrow banding means, e.g., a filter), the output of 81 being coupled into a fiber comprising photorefractive modulator 80. The modulator is responsive to input signal 79, i.e., the amount of radiation transmitted through 80 and thence coupled into 74 varies in response to 79. The modulated cw signal arriving in 73 from 75 typically would be transformed into a standard pulsed signal and then be switched onto line 72 or onto another line 76. It will be understood that the depicted network is exemplary only, and that subscriber stations as described can be used with any fiber network geometry.

Figure 8:
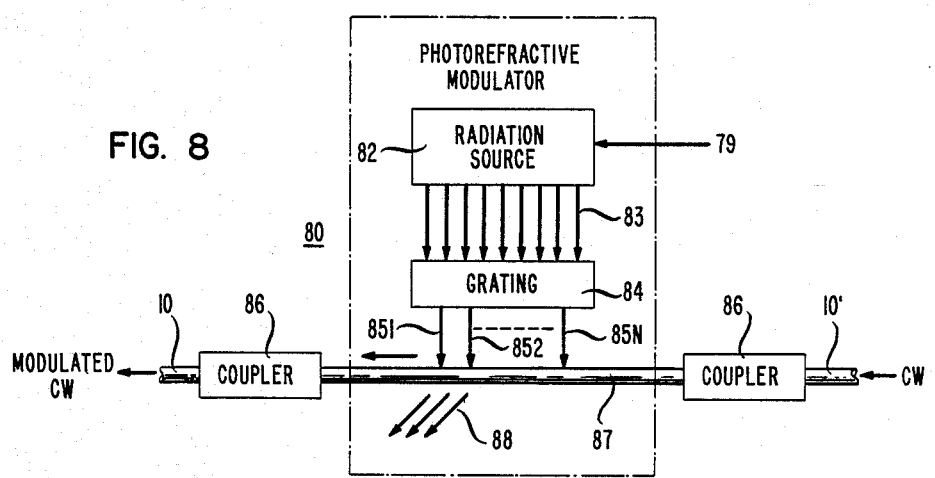
FIG. 8 schematically depicts a photorefractive modulator FIG. 9 schematically shows aspects of an inventive communications system.

FIG. 8 schematically depicts an exemplary photorefractive modulator 80. The modulator comprises means for exposing a region of fiber 87 to spatially and temporally varying radiation. The means comprise a radiation source 82 whose output intensity is responsive to signal 79, and means 84 (e.g., a diffraction grating) for transforming output 83 of 82 into spatially varying radiation, with N maxima 851, 852, . . . 85N. The core of fiber 87 contains an appropriate dopant (e.g., Bi), and radiation 83 is chosen to have a wavelength that causes the dopant to undergo a transition which results in a change of the refractive index of the fiber core. The transformed state advantageously has a relatively short lifetime, such that modulation bandwidths of the order of 1 MHz can be achieved. The length of fiber 87 is coupled to conventional optical fiber (multimode or single mode) 10 and 10' by means of connectors 86, with cw radiation being introduced into 10'. If 83 is modulated temporally, then a temporally varying grating is formed in 87, causing coupling of a time-varying amount of radiation 88 from 87, and consequently amplitude modulation of the radiation in the fiber. For information on the photorefractive effect see, for instance, A. M. Glass, *Optical Engineering*, Vol. 17(5), pp. 470–479 (1978).

One of the advantages of the instant invention is that grating creation by axial distortion requires only such small deformations (typically <0.5 $\mu$m) that fiber damage (including damage to the coating) is essentially nonexistent. Thus, it is possible to attach such couplers to fiber for indefinite periods of time.

Pseudo-periodic inventive couplers may be particularly advantageous for filtering applications, since such gratings can be designed to have substantially no attenuation for radiation outside a well-defined wavelength range. However, it is also possible to achieve effective filtering with periodic, even constant amplitude, gratings. For instance, we have achieved 15 dB excess attenuation at 1.5 $\mu$m, with 0.02 dB excess attenuation at 1.3 $\mu$m, with a constant amplitude (N=60, $\Lambda$=560 $\mu$m) axial distortion grating.

In some circumstances, it may be desirable to provide means for enhancing the radiation of TL modes from the cladding of the single mode fiber. This can be achieved, for instance, by contacting the fiber with an appropriate dielectric body at a downstream location, or by producing a macrobend in the fiber downstream from the grating. Such means are known in the art. See, for instance, U.S. Pat. Nos. 3,931,518 and 4,135,780. Furthermore, it may be advantageous to use a corrugated body not only to produce the grating but also to perform an optical function, e.g., to change the shape of the emitted radiation pattern. Such corrugated transparent dielectric bodies are known (see, U.S. Pat. No. 4,253,727).

EXAMPLE 1

In commercially available single mode optical fiber (8.5 $\mu$m core diameter, 125 $\mu$m fiber diameter, dual polymer coating, diameter of coated fiber 245 $\mu$m, cut-off wavelength of $LP_{11} \sim 1.27 \mu$m) a grating was formed by squeezing an intermediate portion of the coated fiber between two corrugated PMMA members. The members were aligned such that valleys in one member were opposite peaks in the other member. Each corrugation had 10 periods, with a spacing of about 559 $\mu$m. A normal force of about 15 N was applied to the members, resulting in a deformation amplitude of about 0.2 $\mu$m. A commercially available 1.3 $\mu$m laser source was butt-coupled to one end of this optical fiber (to be referred to as the first fiber), the length of the transmission path between source and grating being about 1 km. A commercially available radiation detector was butt-coupled to a short length of single mode optical fiber of the above-described type (to be referred to as the second fiber), and the other end of the second fiber was placed at the focus of a graded index cylindrical lens of 2 mm diameter, with a normalized refractive index difference of about 0.04. The first fiber was mounted on a goniometer stage such that the center of the grating region was at the center of the circular measurement track along which a mounting platform could be moved. The lensed second optical fiber was attached to the platform, and the power of the laser radiation that was emitted from the first fiber and coupled into the second fiber was determined as a function of the angle $\theta$ between the axis of the first fiber and the optical axis of the lensed second fiber. The maximum of detected power was about 18.5 dB below the power coupled into the first fiber, and occurred for $\theta \sim 20°$.

EXAMPLE 2 in a set-up substantially as described above (except that detector and laser source were interchanged), the power that was emitted from the lensed second fiber and coupled into the first fiber by means of the grating was determined. The maximum detected power was about 18 dB below the power coupled into the second fiber, and occurred for $\theta \sim 20°$. The small difference between the powers observed in Examples 1 and 2 is due to the variation in the efficiency of the connectors attached to source and detector, respectively.

As will be readily appreciated by those skilled in the art, the repeat distance Λ(z) and amplitude function g(z) that are associated with a grating are nominal mathematical expressions, and that the actual repeat distance and amplitude of a grating in a fiber may depart from the nominal value, due to unavoidable manufacturing imperfections. However, typically it will be possible for actual repeat distances and amplitudes to be within ±10%, preferably ±5%, of their nominal values.

It will also be appreciated that, although in principle N, the number of elements in a grating, can be any integer greater than 1, typically N will be at least 5, frequently 10 or more.

What is claimed is:

1. Means for coupling electromagnetic radiation of wavelength $\lambda_o$ into or from an intermediate portion of an optical fiber, the fiber comprising a core and a cladding surrounding the core and having optical characteristics including an attenuation constant $\alpha_{ij}$ and a propagation constant $\beta_{ij}$ for each mode $LP_{ij}$ of the radiation that can be present in the fiber, where i is a non-negative integer and j is a positive integer, characterized in that (a) the fiber is a single mode optical fiber at the wavelength $\lambda_o$;

(b) the coupling means comprise means adapted for forming in the intermediate portion of the fiber a grating consisting of N elements, a grating being a portion of fiber in which one or more fiber parameters are caused to vary as a function of the axial coordinate z of the fiber, the fiber parameters including the core refractive index and the fiber axis geometry, associated with the grating being a nominal repeat distance Λ(z) and a nominal amplitude function g(z);

(c) Λ(z) is chosen such that $\Omega_o = (2\pi/\bar{\Lambda}) > \beta_{01} - 2\pi n_{cl}/\lambda_o$, where $\bar{\Lambda}$ is the average repeat spacing in the grating, $\beta_{01}$ is the propagation constant of the $LP_{01}$ mode of radiation, and $n_{cl}$ is the refractive index of the cladding of the fiber;

(d) Λ(z) furthermore is chosen such that $\Omega_o \sim \beta_{01} - \beta_{rs}$, where $\beta_{rs}$ is the propagation constant of the $LP_{rs}$ mode of radiation, where $LP_{rs}$ is a tunneling leaky (TL) mode of the radiation of wavelength $\lambda_o$ in the fiber; and (e) the attenuation constant $\alpha_{rs}$ of the $LP_{rs}$ mode is less than about 1 dB/cm.

2. The coupling means of claim 1, wherein the means adapted for forming a grating comprise means adapted for impressing an undulation upon the fiber axis.

3. The coupling means of claim 2, wherein the means for impressing an undulation upon the fiber axis comprise at least one corrugated body, and means for urging the corrugated body against the fiber.

4. The coupling means of claim 1, wherein the means for locally changing the core refractive index comprise a photo-refractively active chemical element present in the core, and means for exposing the fiber core to actinic radiation, whereby the refractive index of the fiber core can be changed by means of the photo-refractive effect.

5. The coupling means of claim 1, wherein the means for locally changing the core refractive index comprise at least one corrugated body, and means for urging the corrugated body against the fiber, whereby the refractive index of the fiber core can be changed by means of the photo-elastic effect.

6. The coupling means of claim 2, further comprising means for enhancing the emission of radiation from the cladding of the fiber.

7. The coupling means of claim 6, wherein the means for enhancing emission of radiation from the cladding comprise a dielectric body contacting the fiber downstream from the grating, the dielectric body being substantially transparent for the radiation of wavelength $\lambda_o$.

8. The coupling means of claim 1, wherein the $LP_{rs}$ mode is the $LP_{11}$ mode.

9. The coupling means of claim 1, wherein the nominal amplitude function g(z) is a constant.

10. The coupling means of claim 1, wherein the nominal amplitude function g(z) is proportional to a Gaussian function of z.

11. The coupling means of claim 1, wherein the nominal repeat distance Λ(z) is a constant.

12. The coupling means of claim 1, wherein at least the intermediate portion of the fiber is coated with a material that is substantially transparent for the electromagnetic radiation of wavelength $\lambda_o$.

13. The coupling means of claim 1, wherein the means adapted for forming a grating comprise means for locally changing the core refractive index.

14. An optical communications system comprising a source of first electromagnetic radiation of wavelength $\lambda_o$, an optical fiber adapted for guiding the first radiation, first means for coupling the first radiation into the fiber at a first fiber location, and means for detecting, at a second fiber location spaced apart from the first fiber location, the first radiation that is transmitted from the first to the second fiber location through the fiber, the fiber comprising a core and a cladding surrounding the core, the fiber having optical characteristics including an attenuation constant $\alpha_{ij}$ and a propagation constant $\beta_{ij}$ for each mode $LP_{ij}$ of the first radiation that can be present in the fiber, where i is a non-negative integer and j is a positive integer, the optical communications system further comprising second means for coupling first radiation into or from the fiber at a third fiber location intermediate the first and the second fiber locations without breaking or terminating the fiber, characterized in that (a) the fiber is a single mode optical fiber at the wavelength $\lambda_o$;

(b) the second means comprise means adapted for forming in the intermediate portion of the fiber a grating consisting of N elements, a grating being a portion of fiber in which one or more fiber parameters have a regular variation as a function of the axial coordinate z of the fiber, the fiber parameters including the core refractive index and the fiber axis geometry, associated with the grating being a nominal repeat distance Λ(z) and a nominal amplitude function g(z);

(c) Λ(z) is chosen such that $\Omega_o = 2\pi/\bar{\Lambda} > \beta_{01} - 2\pi n_{cl}/\lambda_o$, where $\bar{\Lambda}$ is the average repeat spacing in the grating, $\beta_{01}$ is the propagation constant of the $LP_{01}$ mode of radiation, and $n_{cl}$ is the refractive index of the cladding of the fiber;

(d) Λ(z) furthermore is chosen such that $\Omega_o \sim \beta_{01} - \beta_{rs}$, where $\beta_{rs}$ is the propagation constant of the $LP_{rs}$ mode of radiation, and where $LP_{rs}$ is a tunneling leaky (TL) mode of the radiation of wavelength $\lambda_o$ in the fiber; and (e) the attenuation constant $\alpha_{rs}$ of the $LP_{rs}$ mode is less than about 1 dB/cm.

15. Communications system of claim 14, wherein the second means form a variable attenuator.

16. Communications system of claim 14, wherein the second means comprise clamp-on means comprising corrugated means adapted for forming the grating in the fiber, means for urging the corrugated means against the fiber, and means for detecting the first radiation emitted from the fiber at the third fiber location.

17. Communications system of claim 14, wherein the source of electromagnetic radiation also emits electromagnetic radiation of wavelength other than $\lambda_o$, wherein the first means are adapted for coupling at least some of the radiation of wavelength other than $\lambda_o$ into the fiber at the first fiber location, and wherein the second means form a filter adapted for selectively coupling at least some of the first radiation from the fiber.

* * * * *